US010433300B2

(12) United States Patent
Zhuang et al.

(10) Patent No.: US 10,433,300 B2
(45) Date of Patent: Oct. 1, 2019

(54) RESOURCE ALLOCATION METHOD AND APPARATUS

(71) Applicant: HUAWEI TECHNOLOGIES CO., LTD., Shenzhen, Guangdong (CN)

(72) Inventors: Hongcheng Zhuang, Shenzhen (CN); Zezhou Luo, Shenzhen (CN); Jietao Zhang, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/933,307

(22) Filed: Mar. 22, 2018

(65) Prior Publication Data

US 2018/0213514 A1 Jul. 26, 2018

Related U.S. Application Data

(63) Continuation of application No. PCT/CN2016/090875, filed on Jul. 21, 2016.

(30) Foreign Application Priority Data

Sep. 25, 2015 (CN) .......................... 2015 1 0623701

(51) Int. Cl.
*H04W 72/04* (2009.01)
*H04W 72/08* (2009.01)
*H04W 8/22* (2009.01)

(52) U.S. Cl.
CPC ....... *H04W 72/044* (2013.01); *H04W 72/042* (2013.01); *H04W 72/082* (2013.01); *H04W 8/22* (2013.01); *H04W 72/048* (2013.01)

(58) Field of Classification Search
None
See application file for complete search history.

(56) References Cited

U.S. PATENT DOCUMENTS

| | | | |
|---|---|---|---|
| 9,774,439 B2 * | 9/2017 | Beale | H04W 48/10 |
| 2014/0185465 A1 * | 7/2014 | Balachandran | H04W 4/70 370/252 |
| 2016/0218853 A1 | 7/2016 | Takeda et al. | |

FOREIGN PATENT DOCUMENTS

| | | |
|---|---|---|
| CN | 101026386 A | 8/2007 |
| CN | 101630981 A | 1/2010 |
| CN | 102711123 A | 10/2012 |
| JP | 2015070295 A | 4/2015 |
| WO | 2009063001 A2 | 5/2009 |
| WO | 2010076604 A1 | 7/2010 |

* cited by examiner

*Primary Examiner* — Hong S Cho
(74) *Attorney, Agent, or Firm* — Womble Bond Dickinson (US) LLP

(57) ABSTRACT

Embodiments of the present disclosure describe a resource allocation method and apparatus. In an embodiment, the method may include receiving, by a base station, a downlink signal interference value that is sent by at least one UE associated with the base station and capability information of the at least one UE. The method may also include determining, by the base station, a belonging type of the at least one UE according to the downlink signal interference value and the capability information, and determining a duplex mode of the at least one UE according to the belonging type. Furthermore, the method may include allocating, based on the duplex mode, a resource to the at least one UE, and then sending the resource to the UE.

20 Claims, 6 Drawing Sheets

RESOURCE ALLOCATION METHOD AND APPARATUS

CROSS-REFERENCE TO RELATED APPLICATIONS

This application is a continuation of International Application No. PCT/CN2016/090875, filed on Jul. 21, 2016, which claims priority to Chinese Patent Application No. 201510623701.5, filed on Sep. 25, 2015. The disclosures of the aforementioned applications are hereby incorporated by reference in their entireties.

TECHNICAL FIELD

This disclosure relates to the field of communications technologies, and in particular, to a resource allocation method and apparatus.

BACKGROUND

With continuous development of communications technologies, to increase a network capacity, miniaturization and densification of access points of wireless networks become a development trend of the wireless networks. An ultra-dense network (UDN) enhances a UE throughput and a regional throughput of a system based on user equipment (UE) access with a distance as short as possible.

On one hand, network densification causes a large quantity of overlap areas on a network. A large quantity of UEs are located in these overlap areas. In this case, interference of neighboring cells increases, there are more interfering cells, and interference between neighboring cells is relatively serious. On the other hand, after network densification, a network change becomes more dynamic, causing more complex interference management. Generally, interference management may be performed based on a time domain, a frequency domain, a space domain, or the like. Interference is avoided in an orthogonal manner in these domains. However, in this method for avoiding interference in an orthogonal manner, a static orthogonal method cannot dynamically match a network change, reducing resource utilization. A dynamic orthogonal method causes relatively large signaling overheads.

It can be learned from the foregoing that, in a general case, interference suppression after network densification cannot dynamically match a network change, reducing resource utilization or causing relatively large signaling overheads.

SUMMARY

Embodiments of the present invention provide a resource allocation method and apparatus, so as to resolve a problem that resource utilization is reduced or relatively large signaling overheads are caused because interference suppression after network densification cannot dynamically match a network change.

According to a first aspect, a resource allocation method is provided and includes: obtaining, by a base station, a downlink signal interference value that is sent by at least one UE associated with the base station and capability information of the at least one UE; determining, by the base station, a belonging type of the at least one UE according to the downlink signal interference value and the capability information; determining a duplex mode of the at least one UE according to the belonging type; and allocating, based on the duplex mode, a resource to the at least one UE, and sending the resource to the UE.

With reference to the first aspect, in a first possible embodiment of the first aspect, the downlink signal interference value is obtained by the UE according to a downlink signal value of a serving cell and a downlink interference value of a neighboring cell of the serving cell that are obtained by a measurement.

With reference to the first aspect, in a second possible embodiment of the first aspect, the downlink signal interference value is a signal to interference plus noise ratio (SINR) of a downlink signal; and the determining, by the base station, a belonging type of the at least one UE according to the downlink signal interference value and the capability information includes: if the SINR is greater than or equal to a first specified threshold and the capability information of the UE is that the UE can be associated with at least two base stations, determining that the belonging type of the UE is multi-connection UE; or if the SINR is less than a first specified threshold and the capability information of the UE is that the UE can be associated with only one base station, determining that the belonging type of the UE is single-connection UE.

With reference to the first aspect or the second possible embodiment of the first aspect, in a third possible embodiment of the first aspect, that if the SINR is less than a first specified threshold and the capability information of the UE is that the UE can be associated with only one base station, determining that the belonging type of the UE is single-connection UE includes: if the SINR is less than the first specified threshold, the SINR is greater than or equal to a second specified threshold, and the capability information of the UE is that the UE can be associated with only one base station, determining that the belonging type of the UE is a first type of single-connection UE; if the SINR is less than the second specified threshold, the SINR is greater than or equal to a third specified threshold, and the capability information of the UE is that the UE can be associated with only one base station, determining that the belonging type of the UE is a second type of single-connection UE; or if the SINR is less than the third specified threshold and the capability information of the UE is that the UE can be associated with only one base station, determining that the belonging type of the UE is a third type of single-connection UE, where the second specified threshold is greater than the third specified threshold, and the second specified threshold is less than the first specified threshold.

With reference to the first aspect or the second possible embodiment of the first aspect, in a fourth possible embodiment of the first aspect, the determining a duplex mode of the at least one UE according to the belonging type includes: if the belonging type is multi-connection UE, determining that the duplex mode of the multi-connection UE is frequency division duplex; or if the belonging type is single-connection UE, determining that the duplex mode of the single-connection UE is time division duplex.

With reference to the first aspect or the fourth possible embodiment of the first aspect, in a fifth possible embodiment of the first aspect, the allocating, based on the duplex mode, a resource to the at least one UE includes: determining that a spectrum resource of the multi-connection UE is a multi-connection frequency band, and determining bandwidth of the multi-connection frequency band according to the following manner:

$$BW_{mc} = \frac{\sum T_{i,mc}}{T} BW,$$

where $BW_{mc}$ is the bandwidth of the multi-connection frequency band, T is a resource required by all UEs associated with the base station, BW is total bandwidth, and $T_{i,mc}$ is a resource service required by multi-connection UE associated with a base station i.

With reference to the first aspect or the fourth possible embodiment of the first aspect, in a sixth possible embodiment of the first aspect, the allocating, based on the duplex mode, a resource to the at least one UE includes:

determining that a spectrum resource of the single-connection UE is a single-connection frequency band, and determining bandwidth of the single-connection frequency band according to the following manner:

$BW_{sc} = BW - BW_{mc}$, where $BW_{sc}$ is the bandwidth of the single-connection frequency band, BW is total bandwidth, and $BW_{mc}$ is bandwidth of a multi-connection frequency band.

With reference to the first aspect or the fourth possible embodiment of the first aspect, in a seventh possible embodiment of the first aspect, the time division duplex includes static time division duplex; and the allocating, based on the duplex mode, a resource to the at least one UE includes: for a first type of single-connection UE, setting a priority for the first type of single-connection UE to use a time domain resource of an almost blank subframe (ABS) to the highest; for a second type of single-connection UE, allocating, to the second type of single-connection UE, a timeslot resource that is a first distance away from an uplink and downlink switching point; and for a third type of single-connection UE, allocating, to the third type of single-connection UE, a timeslot resource that is a second distance away from the uplink and downlink switching point, where the first distance is greater than the second distance.

With reference to the first aspect or the fourth possible embodiment of the first aspect, in an eighth possible embodiment of the first aspect, the time division duplex includes dynamic time division duplex; and the allocating, based on the duplex mode, a resource to the at least one UE includes: for a first type of single-connection UE, setting a priority for the first type of single-connection UE to use a time domain resource of an ABS to the highest, and setting, to the highest, a priority for the first type of single-connection UE to use a timeslot resource that is a third distance away from an uplink and downlink switching point; for a second type of single-connection UE, setting, to the highest, a priority for the second type of single-connection UE to use a timeslot resource that is a fourth distance away from the uplink and downlink switching point; and for a third type of single-connection UE, setting, to the highest, a priority for the third type of single-connection UE to use a timeslot resource that is a fifth distance away from the uplink and downlink switching point, where the third distance is greater than or equal to the fourth distance, and the fifth distance is less than the third distance and is less than the fourth distance.

With reference to the first aspect or the fourth possible embodiment of the first aspect, in a ninth possible embodiment of the first aspect, the allocating, based on the duplex mode, a resource to the at least one UE includes:

obtaining, by the base station, a resource required by the single-connection UE for transmitting uplink data and transmitting downlink data; and determining, according to the resource required for transmitting the uplink data and transmitting the downlink data, a timeslot proportion for transmitting the uplink data and the downlink data.

With reference to the first aspect or the ninth possible embodiment of the first aspect, in a tenth possible embodiment of the first aspect, the timeslot proportion for transmitting the uplink data and the downlink data is determined according to the following manner:

$$S_{ul2dl} = \frac{\sum T_{i,ul}}{\sum T_{i,dl}},$$

where $S_{ul2dl}$ is the timeslot proportion, $T_{i,ul}$ is a resource required by the single-connection UE associated with the base station for transmitting the uplink data, and $T_{i,dl}$ is a resource required by the single-connection UE associated with the base station for transmitting the downlink data.

According to a second aspect, a resource allocation apparatus is provided and includes: a receiving module, configured to receive a downlink signal interference value that is sent by at least one user equipment UE associated with a base station and capability information of the at least one UE; a processing module, configured to: determine a belonging type of the at least one UE according to the downlink signal interference value and the capability information, determine a duplex mode of the at least one UE according to the belonging type, and allocate, based on the duplex mode, a resource to the at least one UE; and a sending module, configured to send the resource to the UE.

With reference to the second aspect, in a first possible embodiment of the second aspect, the downlink signal interference value is obtained by the UE according to a downlink signal value of a serving cell and a downlink interference value of a neighboring cell of the serving cell that are obtained by a measurement.

With reference to the second aspect, in a second possible embodiment of the second aspect, the downlink signal interference value is a signal-to-noise ratio SINR of a downlink signal, and the processing module is configured to: if the SINR is greater than or equal to a first specified threshold and the capability information of the UE is that the UE can be associated with at least two base stations, determine that the belonging type of the UE is multi-connection UE; or if the SINR is less than a first specified threshold and the capability information of the UE is that the UE can be associated with only one base station, determine that the belonging type of the UE is single-connection UE.

With reference to the second aspect or the second possible embodiment of the second aspect, in a third possible embodiment of the second aspect, the processing module is configured to: if the SINR is less than the first specified threshold, the SINR is greater than or equal to a second specified threshold, and the capability information of the UE is that the UE can be associated with only one base station, determine that the belonging type of the UE is a first type of single-connection UE; if the SINR is less than a second specified threshold, the SINR is greater than or equal to a third specified threshold, and the capability information of the UE is that the UE can be associated with only one base station, determine that the belonging type of the UE is a second type of single-connection UE; or if the SINR is less than a third specified threshold and the capability information of the UE is that the UE can be associated with only one base station, determine that the belonging type of the UE is a third type of single-connection UE, where the second specified threshold is greater than the third specified threshold, and the second specified threshold is less than the first specified threshold.

With reference to the second aspect or the second possible embodiment of the second aspect, in a fourth possible embodiment of the second aspect, the processing module is specifically configured to: if the belonging type is multi-connection UE, determine that the duplex mode of the multi-connection UE is frequency division duplex; or if the belonging type is single-connection UE, determine that the duplex mode of the single-connection UE is time division duplex.

With reference to the second aspect or the fourth possible embodiment of the second aspect, in a fifth possible embodiment of the second aspect, the processing module is specifically configured to: determine that a spectrum resource of the multi-connection UE is a multi-connection frequency band, and determine bandwidth of the multi-connection frequency band according to the following manner:

$$BW_{mc} = \frac{\sum T_{i,mc}}{T} BW,$$

where $BW_{mc}$ is the bandwidth of the multi-connection frequency band, T is a resource required by all UEs associated with the base station, BW is total bandwidth, and $T_{i,mc}$ is a resource service required by multi-connection UE associated with a base station i.

With reference to the second aspect or the fourth possible embodiment of the second aspect, in a sixth possible embodiment of the second aspect, the processing module is specifically configured to: determine that a spectrum resource of the single-connection UE is a single-connection frequency band, and determine bandwidth of the single-connection frequency band according to the following manner:

$BW_{sc} = BW - BW_{mc}$, where $BW_{sc}$ is the bandwidth of the single-connection frequency band, BW is total bandwidth, and $BW_{mc}$ is bandwidth of a multi-connection frequency band.

With reference to the second aspect or the fourth possible embodiment of the second aspect, in a seventh possible embodiment of the second aspect, the time division duplex includes static time division duplex; and the processing module is specifically configured to: for a first type of single-connection UE, set a priority for the first type of single-connection UE to use a time domain resource of an almost blank subframe ABS to the highest; for a second type of single-connection UE, allocate, to the second type of single-connection UE, a timeslot resource that is a first distance away from an uplink and downlink switching point; and for a third type of single-connection UE, allocate, to the third type of single-connection UE, a timeslot resource that is a second distance away from the uplink and downlink switching point, where the first distance is greater than the second distance.

With reference to the second aspect or the fourth possible embodiment of the second aspect, in an eighth possible embodiment of the second aspect, the time division duplex includes dynamic time division duplex; and the processing module is specifically configured to: for a first type of single-connection UE, set a priority for the first type of single-connection UE to use a time domain resource of an ABS to the highest, and set, to the highest, a priority for the first type of single-connection UE to use a timeslot resource that is a third distance away from an uplink and downlink switching point; for a second type of single-connection UE, set, to the highest, a priority for the second type of single-connection UE to use a timeslot resource that is a fourth distance away from the uplink and downlink switching point; and for a third type of single-connection UE, set, to the highest, a priority for the third type of single-connection UE to use a timeslot resource that is a fifth distance away from the uplink and downlink switching point, where the third distance is greater than or equal to the fourth distance, and the fifth distance is less than the third distance and is less than the fourth distance.

With reference to the second aspect or the fourth possible embodiment of the second aspect, in a ninth possible embodiment of the second aspect, the processing module is specifically configured to: obtain a resource required by the single-connection UE for transmitting uplink data and transmitting downlink data; and determine, according to the resource required for transmitting the uplink data and transmitting the downlink data, a timeslot proportion for transmitting the uplink data and the downlink data.

With reference to the second aspect or the ninth possible embodiment of the second aspect, in a tenth possible embodiment of the second aspect, the processing module is specifically configured to determine, according to the following manner, the timeslot proportion for transmitting the uplink data and the downlink data:

$$S_{ul2dl} = \frac{\sum T_{i,ul}}{\sum T_{i,dl}},$$

where $S_{ul2dl}$ is the timeslot proportion, $T_{i,ul}$ is a resource required by the single-connection UE associated with the base station for transmitting the uplink data, and $T_{i,dl}$ is a resource required by the single-connection UE associated with the base station for transmitting the downlink data.

According to a third aspect, a base station is provided and includes: a receiver, configured to receive a downlink signal interference value that is sent by at least one user equipment UE associated with the base station and capability information of the at least one UE; a processor, configured to: determine a belonging type of the at least one UE according to the downlink signal interference value and the capability information, determine a duplex mode of the at least one UE according to the belonging type, and allocate, based on the duplex mode, a resource to the at least one UE; and a transmitter, configured to send the resource to the UE.

With reference to the third aspect, in a first possible embodiment of the third aspect, the downlink signal interference value is obtained by the UE according to a downlink signal value of a serving cell and a downlink interference value of a neighboring cell of the serving cell that are obtained by a measurement.

With reference to the third aspect, in a second possible embodiment of the third aspect, the downlink signal interference value is a signal-to-noise ratio SINR of a downlink signal, and the processor is specifically configured to: if the SINR is greater than or equal to a first specified threshold and the capability information of the UE is that the UE can be associated with at least two base stations, determine that the belonging type of the UE is multi-connection UE; or if the SINR is less than a first specified threshold and the capability information of the UE is that the UE can be associated with only one base station, determine that the belonging type of the UE is single-connection UE.

With reference to the third aspect or the second possible embodiment of the third aspect, in a third possible embodiment of the third aspect, the processor is specifically configured to: if the SINR is less than the first specified threshold, the SINR is greater than or equal to a second specified threshold, and the capability information of the UE is that the UE can be associated with only one base station, determine that the belonging type of the UE is a first type of single-connection UE; if the SINR is less than a second specified threshold, the SINR is greater than or equal to a third specified threshold, and the capability information of the UE is that the UE can be associated with only one base station, determine that the belonging type of the UE is a second type of single-connection UE; or if the SINR is less than a third specified threshold and the capability information of the UE is that the UE can be associated with only one base station, determine that the belonging type of the UE is a third type of single-connection UE, where the second specified threshold is greater than the third specified threshold, and the second specified threshold is less than the first specified threshold.

With reference to the third aspect or the second possible embodiment of the third aspect, in a fourth possible embodiment of the third aspect, the processor is specifically configured to: if the belonging type is multi-connection UE, determine that the duplex mode of the multi-connection UE is frequency division duplex; or if the belonging type is single-connection UE, determine that the duplex mode of the single-connection UE is time division duplex.

With reference to the third aspect or the fourth possible embodiment of the third aspect, in a fifth possible embodiment of the third aspect, the processor is specifically configured to: determine that a spectrum resource of the multi-connection UE is a multi-connection frequency band, and determine bandwidth of the multi-connection frequency band according to the following manner:

$$BW_{mc} = \frac{\sum T_{i,mc}}{T} BW,$$

where $BW_{mc}$ is the bandwidth of the multi-connection frequency band, T is a resource required by all UEs associated with the base station, BW is total bandwidth, and $T_{i,mc}$ is a resource service required by multi-connection UE associated with a base station i.

With reference to the third aspect or the fourth possible embodiment of the third aspect, in a sixth possible embodiment of the third aspect, the processor is specifically configured to: determine that a spectrum resource of the single-connection UE is a single-connection frequency band, and determine bandwidth of the single-connection frequency band according to the following manner:

$BW_{sc} = BW - BW_{mc}$, where $BW_{sc}$ is the bandwidth of the single-connection frequency band, BW is total bandwidth, and $BW_{mc}$ is bandwidth of a multi-connection frequency band.

With reference to the third aspect or the fourth possible embodiment of the third aspect, in a seventh possible embodiment of the third aspect, the time division duplex includes static time division duplex; and the processor is specifically configured to: for a first type of single-connection UE, set a priority for the first type of single-connection UE to use a time domain resource of an almost blank subframe ABS to the highest; for a second type of single-connection UE, allocate, to the second type of single-connection UE, a timeslot resource that is a first distance away from an uplink and downlink switching point; and for a third type of single-connection UE, allocate, to the third type of single-connection UE, a timeslot resource that is a second distance away from the uplink and downlink switching point, where the first distance is greater than the second distance.

With reference to the third aspect or the fourth possible embodiment of the third aspect, in an eighth possible embodiment of the third aspect, the time division duplex includes dynamic time division duplex; and the processor is specifically configured to: for a first type of single-connection UE, set a priority for the first type of single-connection UE to use a time domain resource of an ABS to the highest, and set, to the highest, a priority for the first type of single-connection UE to use a timeslot resource that is a third distance away from an uplink and downlink switching point; for a second type of single-connection UE, set, to the highest, a priority for the second type of single-connection UE to use a timeslot resource that is a fourth distance away from the uplink and downlink switching point; and for a third type of single-connection UE, set, to the highest, a priority for the third type of single-connection UE to use a timeslot resource that is a fifth distance away from the uplink and downlink switching point, where the third distance is greater than or equal to the fourth distance, and the fifth distance is less than the third distance and is less than the fourth distance.

With reference to the third aspect or the fourth possible embodiment of the third aspect, in a ninth possible embodiment of the third aspect, the processor is specifically configured to: obtain a resource required by the single-connection UE for transmitting uplink data and transmitting downlink data; and determine, according to the resource required for transmitting the uplink data and transmitting the downlink data, a timeslot proportion for transmitting the uplink data and the downlink data.

With reference to the third aspect or the ninth possible embodiment of the third aspect, in a tenth possible embodiment of the third aspect, the processor is specifically configured to determine, according to the following manner, the timeslot proportion for transmitting the uplink data and the downlink data:

$$S_{ul2dl} = \frac{\sum T_{i,ul}}{\sum T_{i,dl}},$$

where $S_{ul2dl}$ is the timeslot proportion, is a resource required by the single-connection UE associated with the base station for transmitting the uplink data, and $T_{i,dl}$ is a resource required by the single-connection UE associated with the base station for transmitting the downlink data.

According to the foregoing technical solutions, the base station determines, according to the downlink signal interference value that is sent by the at least one UE associated with the base station, the belonging type of the UE; determines the duplex mode of the at least one UE according to the belonging type; and allocates, based on the duplex mode, the resource to the at least one UE. The UE is classified into different belonging types based on a degree of interference on the UE, different resources are allocated according to different belonging types, and a spectrum and the duplex mode are appropriately used. Therefore, interference suppression after network densification dynamically matches a network change, thereby improving resource utilization or reducing signaling overheads.

DESCRIPTION OF EMBODIMENTS

With regard to a problem that resource utilization is reduced or relatively large signaling overheads are caused because interference suppression after network densification cannot dynamically match a network change in a general case, in the technical solutions proposed in the embodiments of the present invention, a base station determines, according to a downlink signal interference value that is sent by at least one UE associated with the base station and capability information, a belonging type of the UE; determines a duplex mode of the at least one UE according to the belonging type; and allocates, based on the duplex mode, a resource to the at least one UE. The UE is classified into different belonging types based on a degree of interference on the UE, different resources are allocated according to different belonging types, and a spectrum and the duplex mode are appropriately used. Therefore, interference suppression after network densification dynamically matches a network change, thereby improving resource utilization or reducing signaling overheads.

Figure 1:
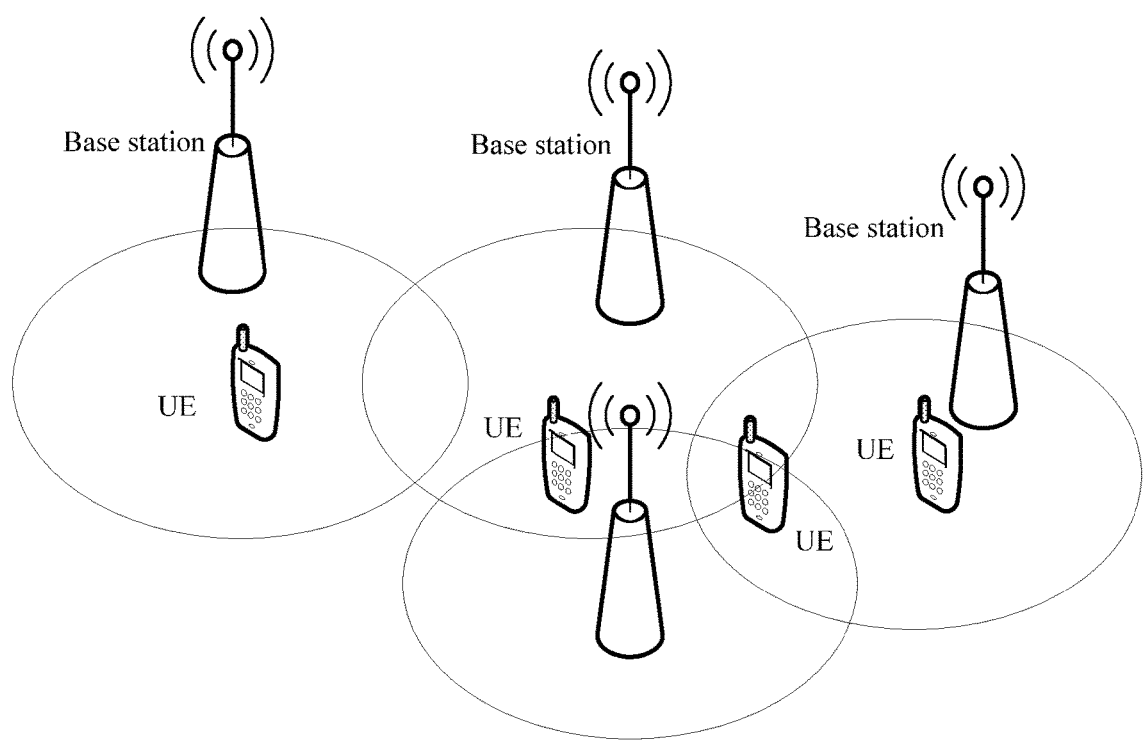
FIG. 1 is a schematic structural composition diagram of an ultra-dense access network according to an embodiment of the present invention.

In the technical solutions proposed in the embodiments of the present invention, as shown in FIG. 1, in an ultra-dense access network environment, access points of a wireless network are miniaturized and densified, and a large quantity of overlap areas exist on the network, such as overlap parts in FIG. 1. UEs are located in these overlap areas. In this way, interference of neighboring cells increases, and there are more interfering cells. In the ultra-dense access network environment, base stations are included. UE accesses the network by using an associated base station. The UE may be single-connection UE, or may be multi-connection UE.

With reference to the accompanying drawings, the following describes, in detail, main principles and specific embodiments of the technical solutions of the embodiments of the present invention and beneficial effects that can be achieved by the technical solutions.

Figure 2:
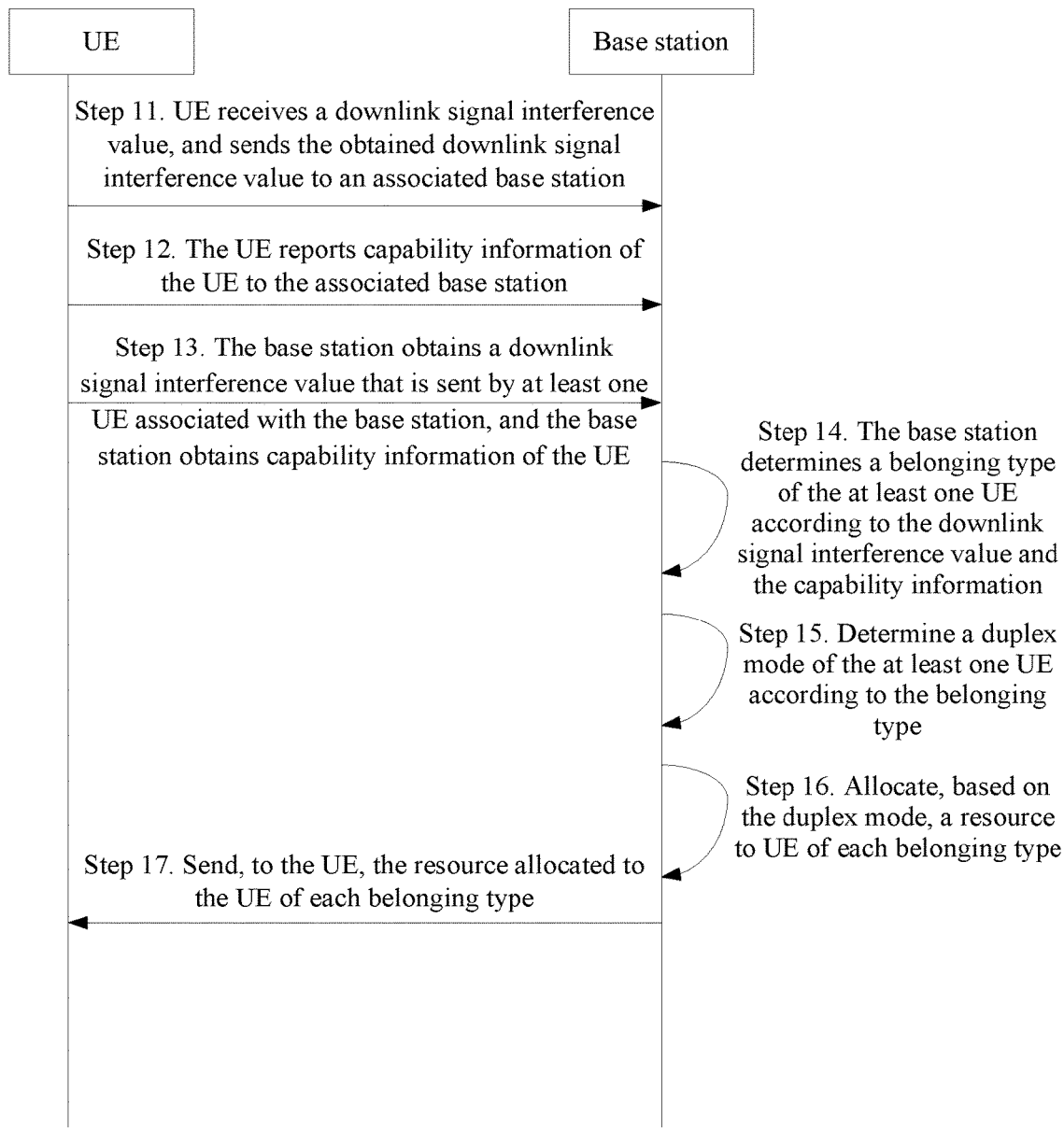
FIG. 2 is a flowchart of a resource allocation method according to an embodiment of the present invention.

An embodiment of the present invention proposes a resource allocation method. As shown in FIG. 2, a specific processing procedure of the method is described as follows.

Step 11. UE obtains a downlink signal interference value, and sends the obtained downlink signal interference value to an associated base station.

The downlink signal interference value is obtained by the UE according to a downlink signal value of a serving cell and a downlink interference value of a neighboring cell of the serving cell that are obtained by a measurement.

The downlink signal interference value includes a signal strength value obtained by measuring, by the UE, a downlink signal of a serving cell in which the UE is currently located, and may further include a downlink interference value obtained by measuring, by the UE, a downlink signal of a neighboring cell of the serving cell.

The UE measures a pilot signal of the serving cell in which the UE is currently located, to obtain the downlink signal value. For example, the UE measures a channel state information-reference signal (CSI-RS) and a reference signal received power (RSRP) of the serving cell, to obtain the downlink signal value.

That the UE measures a downlink signal of a neighboring cell of the serving cell, to obtain a downlink signal interference value of the neighboring cell includes: measuring, by the UE, a sounding reference signal (SRS) of UE in the neighboring cell; or performing, by the UE, measurement on an interference measurement resource (IMR), to obtain the downlink signal interference value.

The UE determines a downlink channel state information (CSI) according to the downlink signal value and the interference value of the neighboring cell that are obtained by a measurement.

After obtaining the downlink signal interference value, the UE may send, by using a measurement report, the obtained downlink signal interference value to the associated base station.

Step 12. The UE reports capability information of the UE to the associated base station.

The capability information of the UE includes: whether the UE supports multi-connection UE, and a duplex capability of the UE, whether the UE is UE supporting time division duplex, UE supporting frequency division duplex, or UE supporting both time division duplex and frequency division duplex.

The UE may report the capability information of the UE once when the UE is being associated with the base station; the UE may periodically report the capability information of the UE to the associated base station; or the UE may report in real time the capability information of the UE to the associated base station.

No time sequence relationship is specified between step 11 and step 12. For ease of description, in the technical solution proposed in this embodiment of the present invention, description is provided according to the foregoing time sequence manner. In a specific embodiment, step 12 may be performed first, and then step 11 is performed.

That the UE reports capability information of the UE to the associated base station may include the following several manners:

In a first manner, a capability information notification message sent by the UE to the associated base station includes the capability information of the UE.

In a second manner, the UE sends the capability information of the UE by using RRC dedicated signaling between the UE and the associated base station.

For example, the UE reports the capability information of the UE to the associated base station by using an RRC connection request message.

In a third manner, the UE reports the capability information of the UE by sending a measurement report to the associated base station.

In this manner, the measurement report sent by the UE includes the downlink signal interference value obtained by the UE by a measurement and the capability information of the UE.

Step 13. The base station receives a downlink signal interference value that is sent by at least one UE associated with the base station, and the base station obtains capability information of the UE.

Step 14. The base station determines a belonging type of the at least one UE according to the downlink signal interference value and the capability information.

The downlink signal interference value may be a signal to interference plus noise ratio (SINR) of a downlink signal.

Figure 3:
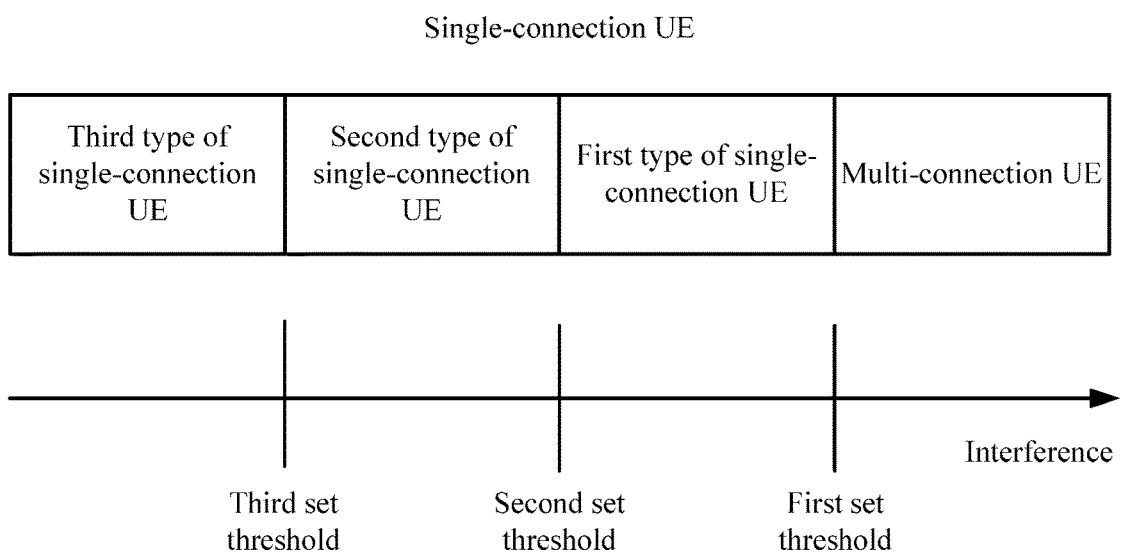
FIG. 3 is a schematic diagram of a UE belonging type according to an embodiment of the present invention.

In the technical solution proposed in this embodiment of the present invention, as shown in FIG. 3, the base station determines the belonging type of the associated UE according to the signal-to-noise ratio of the downlink signal. That is, the base station classifies associated UEs into different clusters. Each cluster is a belonging type.

The belonging type may include two types. One is multi-connection UE, and the other is single-connection UE.

A First Belonging Type: Multi-Connection UE

If the SINR is greater than or equal to a first specified threshold and the capability information of the UE is that the UE can be associated with at least two base stations, it is determined that the belonging type of the UE is multi-connection UE.

In the foregoing first belonging type, if capability information of UE is that the UE is multi-connection UE that can be associated with more than two base stations and an SINR reported by the UE is greater than or equal to the first specified threshold, it is determined that a belonging type of the UE is multi-connection UE.

A Second Belonging Type: Single-Connection UE

If the SINR is less than a first specified threshold and the capability information of the UE is that the UE can be associated with only one base station, it is determined that the belonging type of the UE is single-connection UE.

In the foregoing second belonging type, if capability information of UE is that the UE is single-connection UE that can be associated with only one base station and an SINR reported by the UE is less than the first specified threshold, it is determined that a belonging type of the UE is single-connection UE.

In the technical solution proposed in Embodiment 1 of the present invention, UEs associated with the base station are classified into two different belonging types: multi-connection UEs and single-connection UEs. When a type that is of the foregoing two belonging types and to which UE belongs is being determined, reference is made to capability information reported by the UE, and reference is also made to a downlink signal interference value reported by the UE. In this way, a belonging type of UE may be more accurately determined, so as to reduce interference between cells on an ultra-dense network.

In the technical solution proposed in this embodiment of the present invention, for the belonging type: single-connection UE, the base station further classifies the single-connection UE into different types. As shown in FIG. 3, details are as follows:

A: If the SINR is less than the first specified threshold, the SINR is greater than or equal to a second specified threshold, and the capability information of the UE is that the UE can be associated with only one base station, it is determined that the belonging type of the UE is a first type of single-connection UE.

For example, for connected-state UE, if capability information of UE associated with the base station is that the UE is single-connection UE that can be associated with only one base station, an SINR reported by the UE associated with the base station is less than the first specified threshold, and the SINR reported by the UE associated with the base station is greater than or equal to the second specified threshold, it is determined that a belonging type of the UE associated with the base station is the first type of single-connection UE.

B: If the SINR is less than the second specified threshold, the SINR is greater than or equal to a third specified threshold, and the capability information of the UE is that the UE can be associated with only one base station, it is determined that the belonging type of the UE is a second type of single-connection UE.

For example, for connected-state UE, if capability information reported by UE associated with the base station is that the UE is single-connection UE that can be associated with only one base station, an SINR reported by the UE associated with the base station is less than the second specified threshold, and the SINR reported by the UE associated with the base station is greater than or equal to the third specified threshold, it is determined that a belonging type of the UE associated with the base station is the second type of single-connection UE.

C: If the SINR is less than the third specified threshold and the capability information of the UE is that the UE can be associated with only one base station, it is determined that the belonging type of the UE is a third type of single-connection UE.

For example, for connected-state UE, if capability information of UE associated with the base station is that the UE is single-connection UE that can be associated with only one base station, and an SINR reported by the UE associated with the base station is less than the third specified threshold, it is determined that a belonging type of the UE associated with the base station is the third type of single-connection UE.

The second specified threshold is greater than the third specified threshold, and the second specified threshold is less than the first specified threshold.

In the technical solution proposed in this embodiment of the present invention, for the belonging type: single-connection UE, the single-connection UE is further classified into different types of single-connection UEs. However, in the technical solution provided in this embodiment of the present invention, classification of three different types of single-connection UEs is used as an example for detailed description. In a specific embodiment process, more detailed classification may be further performed on single-connection UE according to different specified thresholds. For example, four different types of single-connection UEs or five different types of single-connection UEs may be obtained by a classification.

For the belonging type: multi-connection UE, detailed classification may be further performed. Specifically, differentiation may be performed by setting different thresholds. Details are not described herein.

In the technical solution proposed in this embodiment of the present invention, the specified thresholds may be determined by a machine learning technique, or may be preset. In an execution process, the specified thresholds may also be modified and dynamically changed according to a specific embodiment.

Step 15. The base station determines a duplex mode of the at least one UE according to the belonging type.

In the technical solution proposed in this embodiment of the present invention, if the belonging type is multi-connection UE, it is determined that a duplex mode of the multi-connection UE is frequency division duplex; or if the belonging type is single-connection UE, it is determined that a duplex mode of the single-connection UE is time division duplex.

Step 16. The base station allocates, based on the duplex mode, a resource to UE of each belonging type.

For UEs of different belonging types (that is, multi-connection UE and single-connection UE), the base station allocates different resources, including the following steps.

A: Determine that a spectrum resource of the multi-connection UE is a multi-connection frequency band, and determine bandwidth of the multi-connection frequency band according to the following formula 1:

$$BW_{mc} = \frac{\sum T_{i,mc}}{T} BW \qquad \text{Formula 1}$$

$BW_{mc}$ is the bandwidth of the multi-connection frequency band, T is a resource required by all UEs associated with the base station, BW is total bandwidth, and $T_{i,mc}$ is a resource service required by multi-connection UE associated with a base station i.

The multi-connection UE communicates with the base station in the frequency division duplex mode by using the multi-connection frequency band. In the technical solution proposed in this embodiment of the present invention, a belonging type is multi-connection UE. Terminal UE of this belonging type is UE that is subject to relatively strong interference, that is, the UE belongs to strong-interference UE. Therefore, the multi-connection UE communicates with the base station in a frequency division duplex mode, thereby avoiding cross timeslot interference among neighboring cells.

A frequency division duplex parameter is mainly bandwidth used for transmitting uplink and downlink signals. The bandwidth may be dynamically determined according to statistics of a service requirement proportion of the multi-connection UE.

A1: The base station collects statistics on a service requirement (such as a data rate requirement) of the multi-connection UE, and sends the statistics to another base station.

For example, the base station collects statistics on the service requirement of the multi-connection UE, and interacts with the another base station by using an interface between the base stations, such as an X2 interface.

A2: The base station collects statistics on a service requirement (such as a data rate requirement) of the multi-connection UE, and reports the statistics to a controller.

B: Determine that a spectrum resource of the single-connection UE is a single-connection frequency band, and determine bandwidth of the single-connection frequency band according to the following formula 2:

$$BW_{sc} = BW - BW_{mc} \qquad \text{Formula 2}$$

$BW_{sc}$ is the bandwidth of the single-connection frequency band, BW is total bandwidth, and $BW_{mc}$ is bandwidth of a multi-connection frequency band.

The single-connection UE communicates with the base station in the time division duplex mode by using the single-connection bandwidth. A time division duplex parameter is mainly an uplink and downlink timeslot proportion. The proportion may be dynamically determined according to statistics of uplink and downlink service requirements of the single-connection UE.

The base station obtains a resource required by the single-connection UE for transmitting uplink data and transmitting downlink data; and determines, according to the resource required for transmitting the uplink data and transmitting the downlink data, a timeslot proportion for transmitting the uplink data and the downlink data.

The timeslot proportion for transmitting the uplink data and the downlink data may be determined according to the following formula 3:

$$S_{ul2dl} = \frac{\sum T_{i,ul}}{\sum T_{i,dl}} \qquad \text{Formula 3}$$

$S_{ul2dl}$ is the timeslot proportion, $T_{i,ul}$ is a resource required by the single-connection UE associated with the base station for transmitting the uplink data, and $T_{i,dl}$ is a resource required by the single-connection UE associated with the base station for transmitting the downlink data.

In step B, time division duplex includes static time division duplex and dynamic time division duplex. Based on different time division duplex modes, a resource may be allocated to UE of each belonging type. In a static time division duplex mode, the following manners are included.

$B^1$: For a first type of single-connection UE, preferentially allocate a time domain resource of an almost blank subframe (ABS) for the first type of single-connection UE.

In the foregoing manner B 1, a priority for the first type of single-connection UE to use the time domain resource of the ABS is set to the highest.

On an ultra-dense network, the priority for the first type of single-connection UE to use the time domain resource of the ABS is set to the highest. When the first type of single-connection UE performs service transmission, interference caused by another type of UE on the first type of single-connection UE is relatively well avoided, thereby ensuring service transmission quality of the first type of single-connection UE and dynamically matching a network change.

$B^2$: For a second type of single-connection UE, allocate, to the second type of single-connection UE, a timeslot resource that is a first distance away from an uplink and downlink switching point.

Figure 4:
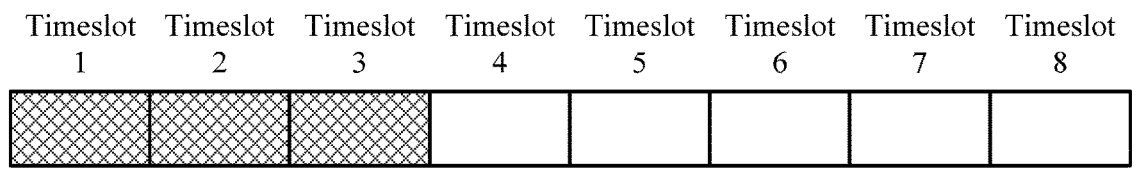
FIG. 4 is a schematic diagram of timeslots of an uplink and downlink switching point.

The timeslot resource includes an uplink timeslot and a downlink timeslot. As shown in FIG. 4, it is assumed that there are a total of eight timeslots, including three uplink timeslots marked as 1 to 3 and five downlink timeslots marked as 4 to 8. A timeslot of an uplink and downlink switching point is between a third timeslot and a fourth timeslot.

B³: For a third type of single-connection UE, allocate, to the third type of single-connection UE, a timeslot resource that is a second distance away from the uplink and downlink switching point.

In the foregoing timeslot resource allocation process, the first distance is greater than the second distance. That is, the timeslot resource that is the first distance away from the uplink and downlink switching point is preferentially allocated to the second type of single-connection UE, thereby preferentially allocating, to the second type of single-connection UE, the timeslot resource that is far away from the uplink and downlink switching point. The timeslot resource that is the second distance away from the uplink and downlink switching point is preferentially allocated to the third type of single-connection UE, thereby preferentially allocating, to the third type of single-connection UE, the timeslot resource that is close to the uplink and downlink switching point.

Figure 5:
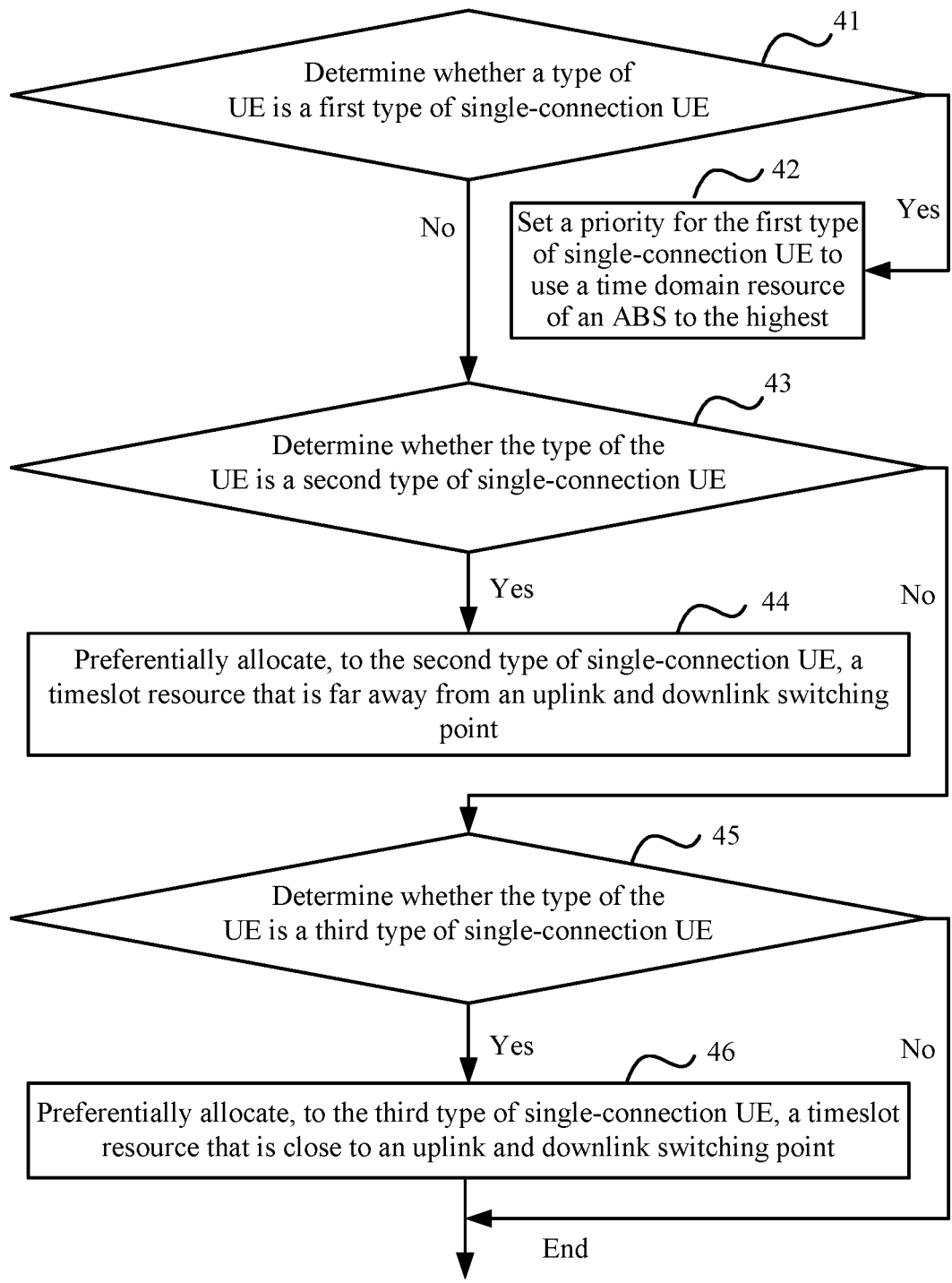
FIG. 5 is a schematic diagram of a specific processing procedure of allocating a resource to each type of UE in a static time division duplex mode according to an embodiment of the present invention.

Specifically, as shown in FIG. 5, in the static time division duplex mode, a specific processing procedure in which the base station allocates a resource to each type of UE is as follows.

Step 41. Determine whether a type of UE is a first type of single-connection UE; and if a determining result is yes, perform step 42, or if a determining result is no, perform step 43.

Step 42. Set a priority for the first type of single-connection UE to use a time domain resource of an ABS to the highest.

Step 43. Determine whether the type of the UE is a second type of single-connection UE; and if a determining result is yes, perform step 44, or if a determining result is no, perform step 45.

Step 44. Preferentially allocate, to the second type of single-connection UE, a timeslot resource that is far away from an uplink and downlink switching point.

Step 45. Determine whether the type of the UE is a third type of single-connection UE; and if a determining result is yes, perform step 46, or if a determining result is no, processing ends.

Step 46. Preferentially allocate, to the third type of single-connection UE, a timeslot resource that is close to an uplink and downlink switching point.

In the technical solution proposed in this embodiment of the present invention, in a static time division duplex mode, during allocation of a resource for each type of UE, a timeslot resource is dynamically allocated according to a distance from an uplink and downlink switching point. Timeslot resources with different distances from the uplink and downlink switching point are allocated to different types of UEs. For a first type of single-connection UE, the first type of single-connection UE includes UE that is subject to the strongest interference from a neighboring cell, but does not support multi-connection UE, and includes UE that is subject to the second strongest interference from a neighboring cell. On an ultra-dense network, a timeslot resource used by the first type of single-connection UE is limited. Therefore, in the technical solution proposed in this embodiment of the present invention, for the first type of single-connection UE, a time domain resource of an ABS is preferentially used. That is, a priority for the first type of single-connection UE to use the time domain resource of the ABS is the highest.

In a dynamic time division duplex mode, that a base station allocates, based on a duplex mode, a resource to UE of each belonging type includes the following manners.

C¹: For a first type of single-connection UE, set a priority for the first type of single-connection UE to use a time domain resource of an ABS to the highest, and set, to the highest, a priority for the first type of single-connection UE to use a timeslot resource that is a third distance away from an uplink and downlink switching point.

C2: For a second type of single-connection UE, set, to the highest, a priority for the second type of single-connection UE to use a timeslot resource that is a fourth distance away from the uplink and downlink switching point.

C3: For a third type of single-connection UE, set, to the highest, a priority for the third type of single-connection UE to use a timeslot resource that is a fifth distance away from the uplink and downlink switching point.

In the foregoing process of dynamically allocating the timeslot resources for the three types of single-connection UEs, during setting of the third distance, the fourth distance, and the fifth distance, the third distance may be equal to the fourth distance, and both the third distance and the fourth distance may be greater than the fifth distance. Alternatively, the third distance may be greater than the fourth distance, and the fourth distance may be equal to the fifth distance. For example, the third distance is equal to the fourth distance, and the third distance is greater than the fifth distance; or the third distance is greater than or equal to the fourth distance, and the fifth distance is less than the third distance and is less than the fourth distance.

For example, for the first type of single-connection UE, the time domain resource of the ABS is preferentially allocated to the first type of single-connection UE, and the first type of single-connection UE preferentially uses a timeslot resource that is far away from the uplink and downlink switching point. For the second type of single-connection UE, a timeslot resource that is far away from the uplink and downlink switching point is allocated to the second type of single-connection UE. In this embodiment, a priority for the second type of single-connection UE to be allocated with a timeslot resource that is far away from the uplink and downlink switching point is lower than a priority for the first type of single-connection UE to be allocated with a timeslot resource that is far away from the uplink and downlink switching point.

For the third type of single-connection UE, a timeslot resource that is close to the uplink and downlink switching point is allocated to the third type of single-connection UE.

Figure 6:
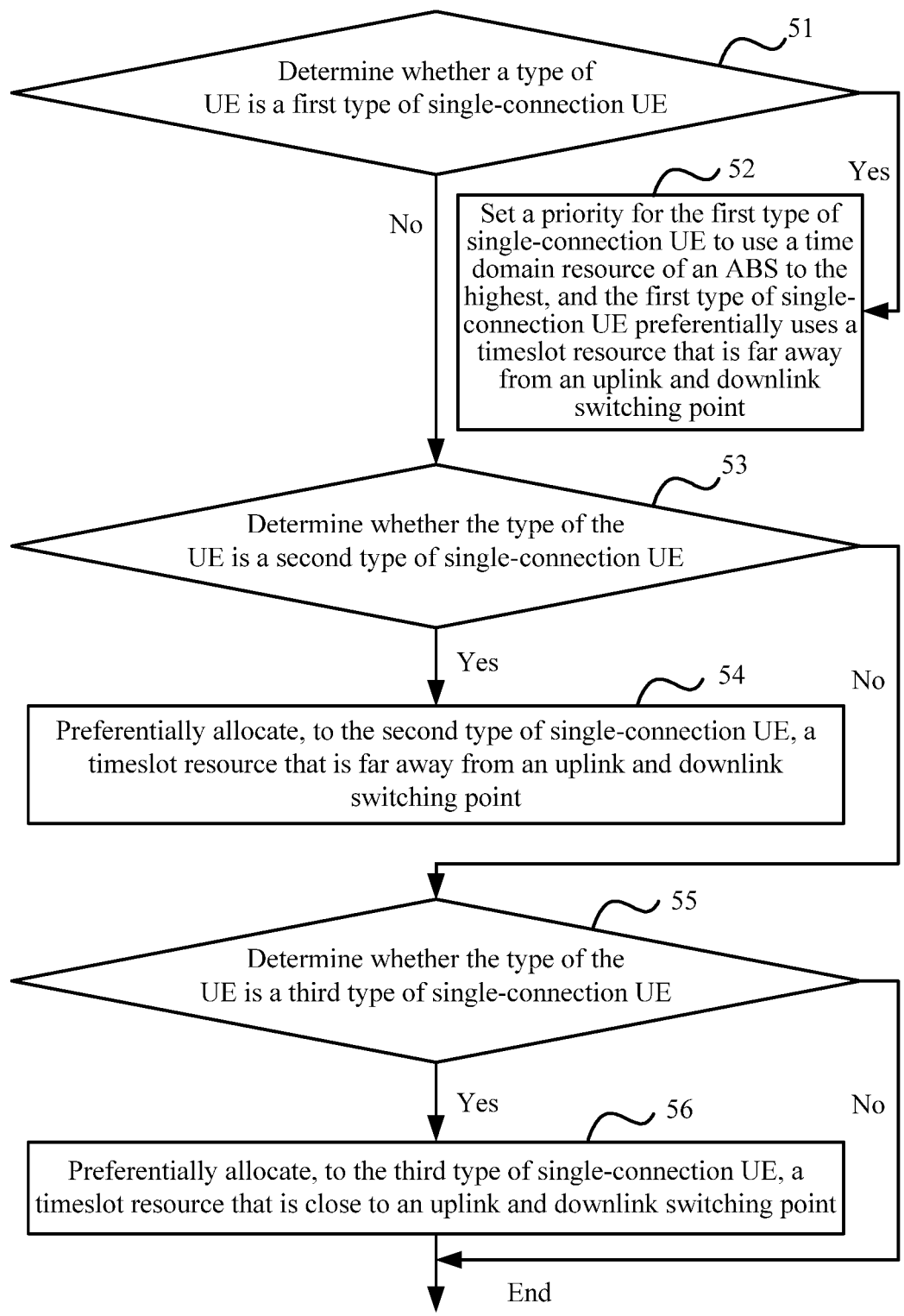
FIG. 6 is a schematic diagram of a specific processing procedure of allocating a resource to each type of UE in a dynamic time division duplex mode according to an embodiment of the present invention.

Specifically, as shown in FIG. 6, in the dynamic time division duplex mode, a specific processing procedure in which the base station allocates a resource to each type of UE is as follows.

Step 51. Determine whether a type of UE is a first type of single-connection UE; and if a determining result is yes, perform step 52, or if a determining result is no, perform step 53.

Step 52. Set a priority for the first type of single-connection UE to use a time domain resource of an ABS to the highest, and the first type of single-connection UE preferentially uses a timeslot resource that is far away from an uplink and downlink switching point.

Step 53. Determine whether the type of the UE is a second type of single-connection UE; and if a determining result is yes, perform step 54, or if a determining result is no, perform step 55.

Step 54. Preferentially allocate, to the second type of single-connection UE, a timeslot resource that is far away from an uplink and downlink switching point.

Step 55. Determine whether the type of the UE is a third type of single-connection UE; and if a determining result is yes, perform step 56, or if a determining result is no, processing ends.

Step 56. Preferentially allocate, to the third type of single-connection UE, a timeslot resource that is close to an uplink and downlink switching point.

Step 17. The base station sends, to the UE, the resource allocated to the UE of each belonging type, so that the UE performs communication according to the allocated resource.

In the technical solution proposed in this embodiment of the present invention, during allocation of a timeslot resource for UE in a dynamic time division duplex mode, a difference between the dynamic time division duplex mode and a static time division duplex mode lies in that uplink and downlink cross timeslot interference is generated between neighboring cells in the dynamic time division duplex mode, and a first type of single-connection UE includes UE that is subject to the strongest interference from a neighboring cell, but does not support multi-connection UE, and further includes UE that is subject to the second strongest interference from a neighboring cell. Therefore, in this mode, although a priority for the UE to use a time domain resource of an ABS is set to the highest, that is, the UE preferentially uses the time domain resource of the ABS, the UE also needs to preferentially use a timeslot resource that is far away from an uplink and downlink switching point. In this way, interference between cells can be relatively well reduced.

Figure 7:
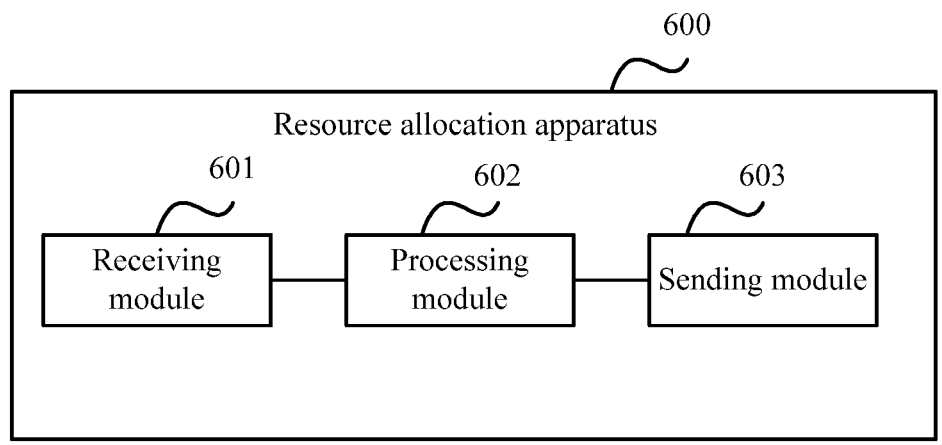
FIG. 7 is a schematic structural composition diagram of a resource allocation apparatus according to an embodiment of the present invention.

An embodiment of the present invention proposes a resource allocation apparatus 600, configured to determine a belonging type of UE and allocate a resource to the UE according to the belonging type. The resource allocation apparatus 600 may be a base station, or may be integrated to a base station as a function module. As shown in FIG. 7, the resource allocation apparatus 600 specifically includes a receiving module 601, a processing module 602, and a sending module 603.

The receiving module 601 is configured to receive a downlink signal interference value that is sent by at least one user equipment UE associated with the base station and capability information of the at least one UE.

Specifically, the downlink signal interference value is obtained by the UE according to a downlink signal value of a serving cell and a downlink interference value of a neighboring cell of the serving cell that are obtained by a measurement.

The processing module 602 is configured to: determine a belonging type of the at least one UE according to the downlink signal interference value and the capability information of the UE; determine a duplex mode of the at least one UE according to the belonging type; and allocate, based on the duplex mode, a resource to the at least one UE. As an example, for a specific process of determining, by the processing module 602, the belonging type of the UE according to the downlink signal interference value and the capability information of the UE, reference may be made to related descriptions in step 14 shown in FIG. 2; for a specific process of determining, by the processing module 602, the duplex mode of the UE according to the belonging type of the UE, reference may be made to related descriptions in step 15 shown in FIG. 2; for a specific process of allocating, based on the duplex mode by the processing module 602, the resource to the UE, reference may be made to descriptions in related parts of step 16 shown in FIG. 2. Details are not described herein.

The sending module 603 is configured to send the allocated resource to the UE, so that the UE performs communication according to the allocated resource.

FIG. 6 shows a simplified schematic diagram of a possible design structure of the resource allocation apparatus 600 provided in the foregoing embodiment. The receiving module 601 is configured to execute, for the resource allocation apparatus, step 13 shown in FIG. 2, that is, the base station obtains the downlink signal interference value that is sent by the at least one UE associated with the base station, and the base station obtains the capability information of the UE. The processing module 602 is configured to execute, for the resource allocation apparatus 600, steps 14, 15, and 16 shown in FIG. 2 and specific processes in steps 14, 15, and 16, that is, determining the belonging type of the at least one UE according to the downlink signal interference value and the capability information; determining the duplex mode of the at least one UE according to the belonging type; and allocating, based on the duplex mode, the resource to the at least one UE.

The sending module 603 is configured to execute, for the resource allocation apparatus 600, step 17 shown in FIG. 2, that is, configured to send the resource to the UE.

Figure 8:
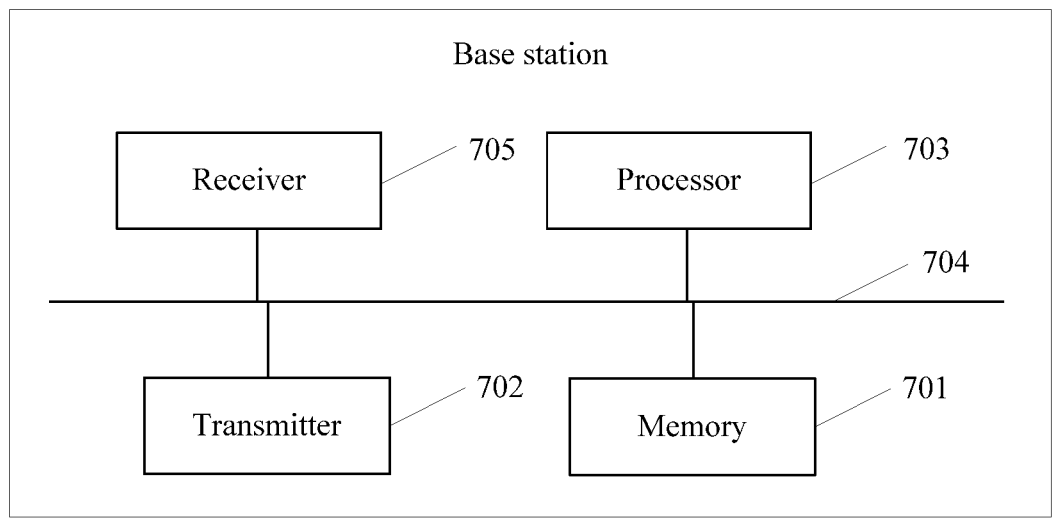
FIG. 8 is a schematic structural composition diagram of a base station according to an embodiment of the present invention.

FIG. 8 shows a simplified schematic diagram of a possible design structure of the base station provided in the foregoing embodiment. The base station may include a memory 701, a transmitter 702, a processor 703, a bus 704, and a receiver 705. The memory 701, the transmitter 702, the processor 703, and the receiver 705 perform communication and are connected by using the bus 704.

The memory 701 may be a read only memory (ROM), a static storage device, a dynamic storage device, or a random access memory (RAM). The memory 701 may store an operating system and another application program. When the technical solution provided in this embodiment of the present invention is implemented by using software or firmware, program code used to implement the technical solution provided in this embodiment of the present invention is stored in the memory 701 and is executed by the processor 703.

The transmitter 702 and the receiver 705 are used for communication between the apparatus and another device or a communications network (for example, but not limited to the Ethernet, a radio access network (RAN), or a wireless local area network (WLAN)).

The processor 703 may be a general-purpose central processing unit (CPU), a microprocessor, an application-specific integrated circuit (ASIC), or one or more integrated circuits configured to execute related programs to implement the technical solution provided in this embodiment of the present invention. The processor 703 may also be a network processor (NP), a combination of a CPU and an NP, or a combination of an NP and a hardware chip.

It should be noted that, although hardware shown in FIG. 8 indicates only the memory 701, the transmitter 702, the receiver 705, the processor 703, and the bus 704, in a specific embodiment process, a person skilled in the art should understand that, the base station further includes other components required for implementing normal operating. In addition, according to a specific requirement, a person skilled in the art should understand that, the base station may further include hardware components for implementing other functions.

As an example, the receiver 705 is configured to execute, for the base station, step 13 shown in FIG. 2, that is, receiving the downlink signal interference value that is sent by the at least one user equipment UE associated with the base station and the capability information of the at least one UE.

The processor 703 is coupled with the memory 701, the transmitter 702, and the receiver 705, and is configured to execute, for the base station, steps 14, 15, and 16 shown in FIG. 2 and specific processes in steps 14, 15, and 16, that is, determining the belonging type of the at least one UE according to the downlink signal interference value and the capability information; determining the duplex mode of the at least one UE according to the belonging type; and allocating, based on the duplex mode, the resource to the at least one UE.

The transmitter 702 is configured to execute, for the base station in executing step 17 shown in FIG. 2, that is, configured to send the resource to the UE.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

A person skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A resource allocation method, comprising:
   receiving, by a base station, a downlink signal interference value that is sent by at least one user equipment (UE) associated with the base station and capability information of the at least one UE;
   determining, by the base station, a belonging type of the at least one UE according to the downlink signal interference value and the capability information;
   determining a duplex mode of the at least one UE according to the belonging type;
   allocating, based on the duplex mode, a resource to the at least one UE; and
   sending the resource to the UE.

2. The method according to claim 1, wherein the downlink signal interference value is obtained by the UE according to a downlink signal value of a serving cell and a downlink signal interference value of a neighboring cell of the serving cell that are obtained by a measurement.

3. The method according to claim 1, wherein the downlink signal interference value is a signal to interference plus noise ratio (SINR) of a downlink signal; and
   the determining, by the base station, a belonging type of the at least one UE according to the downlink signal interference value and the capability information comprises:
   if the SINR is greater than or equal to a first specified threshold and the capability information of the UE is that the UE can be associated with at least two base stations, determining that the belonging type of the UE is multi-connection UE; or if the SINR is less than a first specified threshold and the capability information of the UE is that the UE can be associated with only one base station, determining that the belonging type of the UE is single-connection UE.

4. The method according to claim 3, wherein that if the SINR is less than a first specified threshold and the capability information of the UE is that the UE can be associated with only one base station, determining that the belonging type of the UE is single-connection UE comprises:
   if the SINR is less than the first specified threshold, the SINR is greater than or equal to a second specified threshold, and the capability information of the UE is that the UE can be associated with only one base station, determining that the belonging type of the UE is a first type of single-connection UE;
   if the SINR is less than a second specified threshold, the SINR is greater than or equal to a third specified threshold, and the capability information of the UE is that the UE can be associated with only one base station, determining that the belonging type of the UE is a second type of single-connection UE; or
   if the SINR is less than a third specified threshold and the capability information of the UE is that the UE can be associated with only one base station, determining that the belonging type of the UE is a third type of single-connection UE, wherein the second specified threshold is greater than the third specified threshold, and the second specified threshold is less than the first specified threshold.

5. The method according to claim 3, wherein the determining a duplex mode of the at least one UE according to the belonging type comprises:
if the belonging type is multi-connection UE, determining that the duplex mode of the multi-connection UE is frequency division duplex; or if the belonging type is single-connection UE, determining that the duplex mode of the single-connection UE is time division duplex.

6. The method according to claim 5, wherein the allocating, based on the duplex mode, a resource to the at least one UE comprises:
determining that a spectrum resource of the multi-connection UE is a multi-connection frequency band, and determining bandwidth of the multi-connection frequency band according to the following manner:

$$BW_{mc} = \frac{\sum T_{i,mc}}{T} BW,$$

wherein
$BW_{mc}$ is the bandwidth of the multi-connection frequency band, T is a resource required by all UEs associated with the base station, BW is total bandwidth, and $T_{i,mc}$ is a resource service required by multi-connection UE associated with a base station i.

7. The method according to claim 5, wherein the allocating, based on the duplex mode, a resource to the at least one UE comprises:
determining that a spectrum resource of the single-connection UE is a single-connection frequency band, and determining bandwidth of the single-connection frequency band according to the following manner:

$BW_{sc} = BW - BW_{mc}$, wherein $BW_{sc}$ is the bandwidth of the single-connection frequency band, BW is total bandwidth, and $BW_{mc}$ is bandwidth of a multi-connection frequency band.

8. The method according to claim 5, wherein the time division duplex comprises static time division duplex; and the allocating, based on the duplex mode, a resource to the at least one UE comprises:
for a first type of single-connection UE, setting a priority for the first type of single-connection UE to use a time domain resource of an almost blank subframe (ABS) to the highest;
for a second type of single-connection UE, allocating, to the second type of single-connection UE, a timeslot resource that is a first distance away from an uplink and downlink switching point; and
for a third type of single-connection UE, allocating, to the third type of single-connection UE, a timeslot resource that is a second distance away from the uplink and downlink switching point, wherein
the first distance is greater than the second distance.

9. The method according to claim 5, wherein the time division duplex comprises dynamic time division duplex; and
the allocating, based on the duplex mode, a resource to the at least one UE comprises:
for a first type of single-connection UE, setting a priority for the first type of single-connection UE to use a time domain resource of an ABS to the highest, and setting, to the highest, a priority for the first type of single-connection UE to use a timeslot resource that is a third distance away from an uplink and downlink switching point;
for a second type of single-connection UE, setting, to the highest, a priority for the second type of single-connection UE to use a timeslot resource that is a fourth distance away from the uplink and downlink switching point; and
for a third type of single-connection UE, setting, to the highest, a priority for the third type of single-connection UE to use a timeslot resource that is a fifth distance away from the uplink and downlink switching point, wherein
the third distance is greater than or equal to the fourth distance, and the fifth distance is less than the third distance and is less than the fourth distance.

10. The method according to claim 5, wherein the allocating, based on the duplex mode, a resource to the at least one UE comprises:
obtaining, by the base station, a resource required by the single-connection UE for transmitting uplink data and transmitting downlink data; and
determining, according to the resource required for transmitting the uplink data and transmitting the downlink data, a timeslot proportion for transmitting the uplink data and the downlink data.

11. The method according to claim 10, wherein the timeslot proportion for transmitting the uplink data and the downlink data is determined according to the following manner:

$$S_{ul2dl} = \frac{\sum T_{i,ul}}{\sum T_{i,dl}},$$

wherein
$S_{ul2dl}$ is the timeslot proportion, $T_{i,ul}$ is a resource required by the single-connection UE associated with the base station for transmitting the uplink data, and $T_{i,dl}$ is a resource required by the single-connection UE associated with the base station for transmitting the downlink data.

12. A resource allocation apparatus, comprising:
a receiver, configured to receive a downlink signal interference value that is sent by at least one user equipment (UE) associated with a base station and capability information of the at least one UE;
a processor, configured to: determine a belonging type of the at least one UE according to the downlink signal interference value and the capability information; determine a duplex mode of the at least one UE according to the belonging type; and allocate, based on the duplex mode, a resource to the at least one UE; and
a transmitter, configured to send the resource to the UE.

13. The apparatus according to claim 12, wherein the downlink signal interference value is a signal to interference plus noise ratio (SINR) of a downlink signal; and
the processor is specifically configured to: if the SINR is greater than or equal to a first specified threshold and the capability information of the UE is that the UE can be associated with at least two base stations, determine that the belonging type of the UE is multi-connection UE; or if the SINR is less than a first specified threshold and the capability information of the UE is that the UE can be associated with only one base station, determine that the belonging type of the UE is single-connection UE.

14. The apparatus according to claim 13, wherein the processor is configured to: if the SINR is less than the first specified threshold, the SINR is greater than or equal to a second specified threshold, and the capability information of the UE is that the UE can be associated with only one base station, determine that the belonging type of the UE is a first type of single-connection UE; if the SINR is less than a second specified threshold, the SINR is greater than or equal to a third specified threshold, and the capability information of the UE is that the UE can be associated with only one base station, determine that the belonging type of the UE is a second type of single-connection UE; or if the SINR is less than a third specified threshold and the capability information of the UE is that the UE can be associated with only one base station, determine that the belonging type of the UE is a third type of single-connection UE, wherein the second specified threshold is greater than the third specified threshold, and the second specified threshold is less than the first specified threshold.

15. The apparatus according to claim 13, wherein the processor is configured to: if the belonging type is multi-connection UE, determine that the duplex mode of the multi-connection UE is frequency division duplex; or if the belonging type is single-connection UE, determine that the duplex mode of the single-connection UE is time division duplex.

16. The apparatus according to claim 15, wherein the processor is configured to: determine that a spectrum resource of the multi-connection UE is a multi-connection frequency band, and determine bandwidth of the multi-connection frequency band according to the following manner:

$$BW_{mc} = \frac{\sum T_{i,mc}}{T} BW,$$

wherein
$BW_{mc}$ is the bandwidth of the multi-connection frequency band, T is a resource required by all UEs associated with the base station, BW is total bandwidth, and $T_{i,mc}$ is a resource service required by multi-connection UE associated with a base station i.

17. The apparatus according to claim 15, wherein the processor is configured to: determine that a spectrum resource of the single-connection UE is a single-connection frequency band, and determine bandwidth of the single-connection frequency band according to the following manner:

$BW_{sc} = BW - BW_{mc}$, wherein $BW_{sc}$ is the bandwidth of the single-connection frequency band, BW is total bandwidth, and $BW_{mc}$ is bandwidth of a multi-connection frequency band.

18. The apparatus according to claim 15, wherein the time division duplex comprises static time division duplex; and the processor is configured to: for a first type of single-connection UE, set a priority for the first type of single-connection UE to use a time domain resource of an almost blank subframe (ABS) to the highest; for a second type of single-connection UE, allocate, to the second type of single-connection UE, a timeslot resource that is a first distance away from an uplink and downlink switching point; and for a third type of single-connection UE, allocate, to the third type of single-connection UE, a timeslot resource that is a second distance away from the uplink and downlink switching point, wherein the first distance is greater than the second distance.

19. The apparatus according to claim 15, wherein the time division duplex comprises dynamic time division duplex; and the processor is configured to: for a first type of single-connection UE, set a priority for the first type of single-connection UE to use a time domain resource of an ABS to the highest, and set, to the highest, a priority for the first type of single-connection UE to use a timeslot resource that is a third distance away from an uplink and downlink switching point; for a second type of single-connection UE, set, to the highest, a priority for the second type of single-connection UE to use a timeslot resource that is a fourth distance away from the uplink and downlink switching point; and for a third type of single-connection UE, set, to the highest, a priority for the third type of single-connection UE to use a timeslot resource that is a fifth distance away from the uplink and downlink switching point, wherein the third distance is greater than or equal to the fourth distance, and the fifth distance is less than the third distance and is less than the fourth distance.

20. The apparatus according to claim 15, wherein the processor is configured to:
obtain a resource required by the single-connection UE for transmitting uplink data and transmitting downlink data; and determine, according to the resource required for transmitting the uplink data and transmitting the downlink data, a timeslot proportion for transmitting the uplink data and the downlink data.

* * * * *